United States Patent [19]
Itoh

[11] 4,198,127
[45] Apr. 15, 1980

[54] WIDE ANGLE ZOOM LENS SYSTEM HAVING SMALL DISTORTION

[75] Inventor: Takayuki Itoh, Tokyo, Japan

[73] Assignee: Asahi Kogaku Kogyo Kabushiki Kaisha, Tokyo, Japan

[21] Appl. No.: 966,408

[22] Filed: Dec. 4, 1978

[30] Foreign Application Priority Data

Dec. 2, 1977 [JP] Japan .............................. 52-144838

[51] Int. Cl.$^2$ .............................................. G02B 15/16
[52] U.S. Cl. ..................................... 350/184; 350/207
[58] Field of Search ................ 350/184, 186, 176, 207

[56] References Cited

U.S. PATENT DOCUMENTS

3,848,969  11/1974  Tajima ............................. 350/176 X

FOREIGN PATENT DOCUMENTS

2557547  7/1976  Fed. Rep. of Germany ........... 350/184
1404284  5/1965  France ...................................... 350/184

*Primary Examiner*—Paul A. Sacher
*Attorney, Agent, or Firm*—Sughrue, Rothwell, Mion, Zinn and Macpeak

[57] ABSTRACT

The present invention provides a compact zoom lens which exhibits small distortion aberration. The lens system comprises, in order from the object side, a front lens group having a negative focal length and a rear lens group having a positive focal length. The front lens group is a first lens group. The rear lens group is separated into a second lens group having a positive focal length and a third lens group having a negative focal length. The overall focal length is variable by moving mechanically the first, second and third lens groups, but the position of the image surface is maintained constant. The first lens group comprises, in order from the object side, positive, negative and positive units. The second lens group comprises, in order from the object side, positive, negative and positive units. The third lens group comprises, in order from the object side, a positive lens, a double concave negative lens and a positive lens.

4 Claims, 17 Drawing Figures

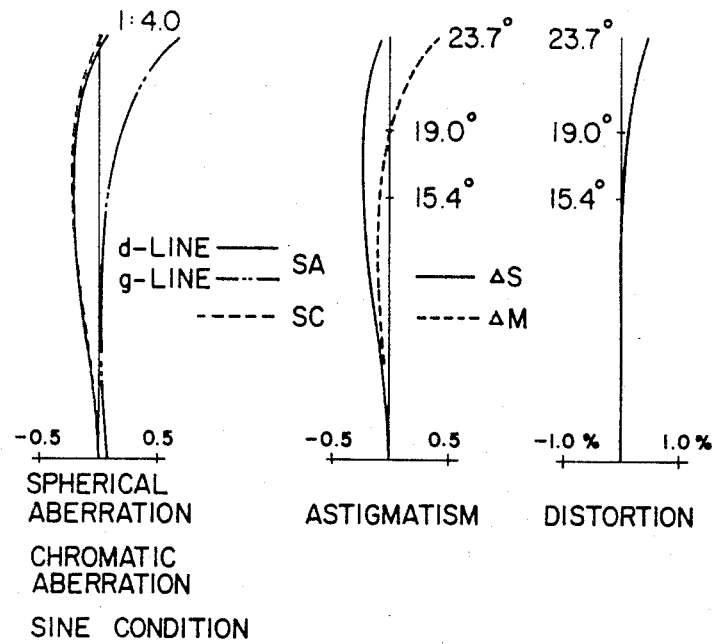
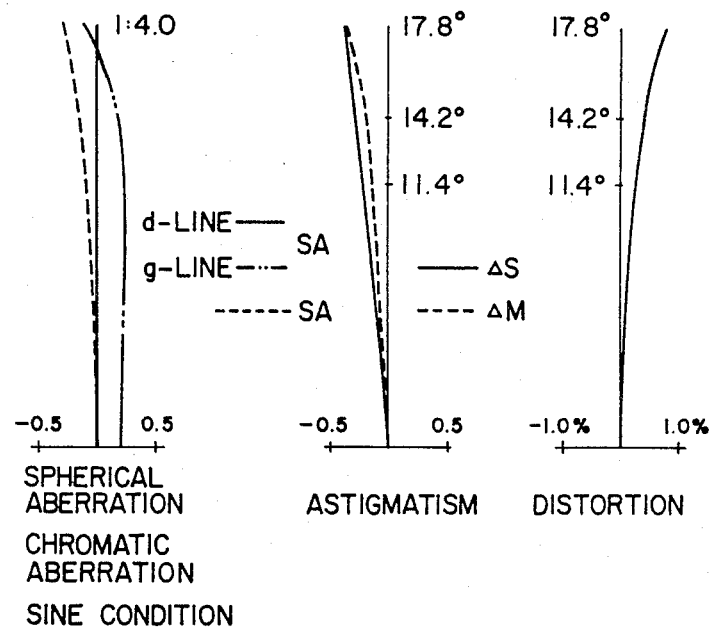

WIDE ANGLE ZOOM LENS SYSTEM HAVING SMALL DISTORTION

BACKGROUND OF THE INVENTION

1. Field of the Invention

The present invention relates to a compact zoom lens covering a wide angle, wherein distortion aberration during the overall zoom range is compensated for to the same extent as in a fixed focus lens.

2. Description of the Prior Art

A so-called two-lens group type zoom lens has been constructed of a first lens group having a negative focal length and a second lens group having a positive focal length. In such a lens, barrel distortion aberration is remarkable at the wide angle end. Therefore, it is considered to be very difficult to obtain a compact zoom lens having distortion aberration as small as a fixed focus lens. Applicant's U.S. patent application Ser. No. 928,321 filed on July 26, 1978 and entitled "ZOOM LENS HAVING A SMALL DISTORTION ABERRATION" relates to a small distortion zoom lens. Brightness of the zoom lens system is represented by an aperture ratio of 1:4.5 or 1:5.6 and a view angle thereof at a wide angle end is at 48°. In contrast, brightness of the present invention is represented by an aperture ratio of 1:4.0 and a view angle thereof at a wide angle end is at 65°. The lens system of the above-described application Ser. No. 928,321 has a narrower angle than that of the present invention. The brightness of the lens system of the prior art is less than that of the present invention.

SUMMARY OF THE INVENTION

Briefly, the present invention provides a compact zoom lens system having small distortion aberration and novel construction.

The lens system of the present invention comprises, in order from the object, a front lens group having a negative focal length and a rear lens group having a positive focal length. The front lens group is represented by a first lens group and the rear lens group is separated into a second lens group having a positive focal length and a third lens group having a negative focal length in order to satisfy a predetermined condition of the lens group arrangement. The overall focal length is variable by mechanical movements of the first, second and third lens groups while maintaining the image focussing surface constant.

More specifically, the first lens group comprises, in order from the object side, positive, negative and positive lens units, also in order from the object side the first lens unit including a positive lens having an object side convex surface directed to the object, the next negative lens unit including at least two negative lenses and the final positive lens unit including a positive lens having a large curvature convex surface, on the object side, directed to the object. The second lens group comprises, in order from the object side, positive, negative and positive lens units, the positive lens unit on the object side including two or three positive lenses and the positive lens unit on the image side including one or two positive lenses. The third lens group comprises, in order from the object side, a positive lens having a large curvature convex surface on the image side directed to the image, a double concave negative lens and a positive lens having a large curvature convex surface on the object side directed to the object.

BRIEF DESCRIPTION OF THE DRAWINGS

FIGS. 7(a), 7(b) and 7(c) are graphs plotting the aberration curves obtained at the wide angle, middle angle, and narrow angle positions, respectively, of the zoom lens system according to EXAMPLE 3;

DESCRIPTION OF THE PREFERRED EMBODIMENT

Figure 1:
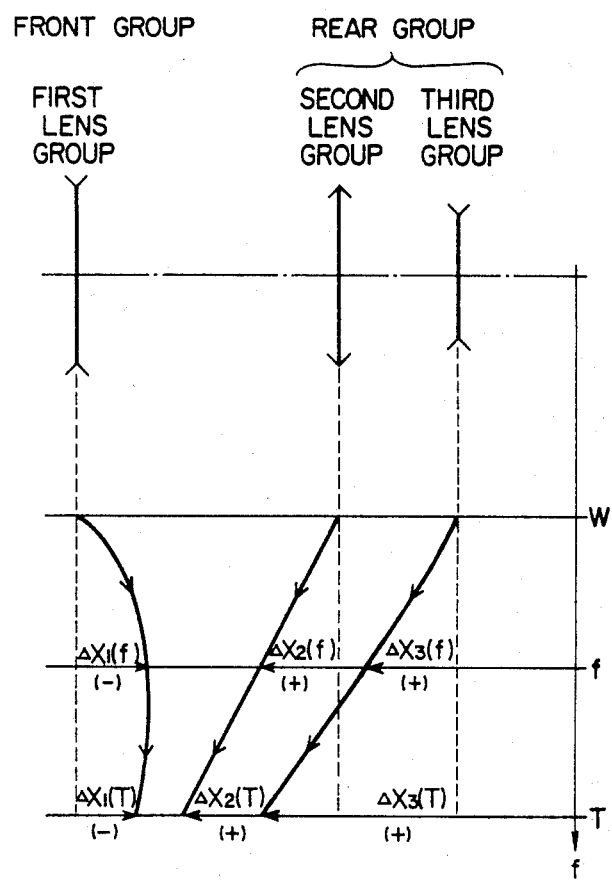
FIG. 1 is a schematic illustration of a zoom mode of the present invention.

A zoom mode of the present invention will now be described. There are three elements in a first lens group having a negative focal length, a second lens group having a positive focal length and a third lens group having a negative focal length. If two conditions of focal length of the overall lens system and a back focal length are satisfied for the above-described three elements, there is still a degree of freedom. Using the one degree of freedom, the three lens groups are arbitrarily and successively arranged at best balanced position of aberration compensation. In other words, movement of one of three lens groups of the first, second and third lens groups depends on movement of the other one or two lens groups, and the three lens groups are arranged at the best balanced position for aberration compensation. According to the present invention, the movement of the third lens group depends on the non-linear movement of the first lens group and the substantially linear movement of the second lens group in response to the overall focal length as shown in FIG. 1. Basing on the arrangement at wide angle, when the overall focal length becomes f the amount of movement of the first lens group is $\Delta X_I(f)$, the amount of movement of the second lens is $\Delta X_{II}(f)$ and the amount of movement of the third lens group is $\Delta X_{III}(f)$ as shown in FIG. 1. If these relations are established, the following condition must be satisfied by the arrangement of the three lens groups.

$$\Delta X_{III}(f) = K_1(f)\Delta X_I(f) + K_2(f)\Delta X_{II}(f) \tag{1}$$

The equation (1) can be also represented as follows.

$$\Delta X_{III}(f) = K(f)\Delta X_{II}(f) \qquad (2)$$

where an order or power of the function $K(f)$ is higher than that of either function $K_1(f)$ or function $K_2(f)$, and $K_1(f)$, $K_2(f)$ and $K(f)$ are proportion constants for determining the amount of movement of the third lens group when the overall focal length is f.

The conditions will now be described in detail. The zoom lens system covering wide angle and having small distortion satisfies the following;

$$1.0 < \frac{f_W}{f_{WI\,II}} < 1.35 \qquad (1)$$

$$0.0 < \frac{f_W}{|f_{III}|} < 0.35 \qquad (2)$$

$$1.0 \leq \frac{\Delta X_{III}(T)}{\Delta X_{II}(T)} < 1.2 \qquad (3)$$

$$0.9 < \frac{\Delta X_{III}(f)}{\Delta X_{II}(f)} < 1.3 \qquad (4)$$

$$0.3 < \frac{f_W}{f_{III1}} < 1.0 \qquad (5)$$

$$0.0 \leq \frac{l_{III1}}{f_W} < 0.02 \qquad (6)$$

$$1.67 < N_{III2} \qquad (7)$$

where;

$f_W$ is the overall focal length at the wide angle end;

$f_{WIII}$ is the resultant focal length of the first and second lens groups at the wide angle end;

$f_{III}$ is the focal length of the third lens group;

$\Delta X_{II}(T)$ is the amount of movement of the second lens group at the telephoto end from the wide angle end;

$\Delta X_{III}(T)$ is the amount of movement of the third lens group at the telephoto end from the wide angle end;

$\Delta X_{II}(f)$ is the amount of movement of the second lens group at a overall focal length f from the wide angle end;

$\Delta X_{III}(f)$ is the amount of movement of the third lens group at a overall focal length f from the wide angle end;

$f_{III1}$ is the focal length of the first positive lens within the third lens group;

$l_{III1}$ is the aerial space between the first positive lens and the first negative lens within the third lens group; and $N_{III2}$ is the refractive index on d-line of the first negative lens within the third lens group.

In comparison with the above-described U.S. Application Ser. No. 928,321, the view angles 65° at the wide angle end of the present lens system is wider than the view angle 48° thereat of the wide angle disclosed in the application Ser. No. 928,321. Accordingly, the first lens group of the present invention comprises positive, negative and positive lens units since it is insufficient to well compensate for barrel distortion aberration by using the first lens group composed only of negative and positive lens groups.

Conditions (1) and (2) relate to lens power arrangement and at the same time are provided for separating the rear lens group into the second and third lens groups.

If the lower limit of Condition (1) is exceeded, the third lens group cannot have a negative focal length and lens system becomes excessively large. If the upper limit is exceeded the lens system is effectively miniaturized, the barrel distortion aberration is remarkable and the back focal length is shortened disadvantageously. In order to compensate for this condition the negative lens power of the third lens group must be increased so that the compensation of the other various aberrations is difficult.

Condition (2) cooperates with Condition (1). If the upper limit of Condition (2) is exceeded, though the lens system can be readily miniaturized, the negative lens power of the third lens group is excessive. Hence the distortion aberration compensation is difficult with good balance to astigmatism, field curvature aberration and the like.

Conditions (3) and (4) relate to a mode of zoom of the present invention. As mentioned above, the zoom mode of the present invention is achieved by movement of the third lens group depending on the movements of the first and second lens groups.

If the lower limit of Condition (3) is exceeded, the aerial space between the second and third lens groups is longer at the telephoto end than it is at the wide angle end. The amount of variation of the overall focal length becomes small in response to the amount of variation of the aerial space between the first and second lens groups. As a result, the aerial space must be widened between the first and second lens groups. It is difficult to compensate for barrel distortion aberration at the wide angle end and the lens system becomes excessively large. Conversely, exceeding the upper limit, though available to miniaturize the lens system, the aerial space between the second and third lens groups at the wide angle end becomes long and the back focal length is disadvantageously shortened. The negative lens power of the third lens group must be enhanced in order to compensate for this disadvantage and the compensation of the various aberrations is difficult.

Condition (4) relates to the overall focal length in the middle, especially at the position adjacent the wide angle end. If the lower limit is exceeded, the aerial space between the second and third lens groups is longer in the middle position than at the wide angle end. The variation is excessively large, and it is effective to compensate for the barrel distortion in the middle position. However, the image is exaggerated and the variation of astigmatism and field curvature aberration is remarkable in response to the variation of the overall focal length. Conversely, if the upper limit is exceeded, the image is underestimated in the middle position and the variation of astigmatism and field curvature aberration in connection with the variation of the overall focal length is large. The compensation thereof is difficult.

Conditions (5), (6) and (7) relate to the third lens group. Since in the present invention, the viewing angle at the wide angle end is widened, it is impossible to increase the negative lens power of the third lens group in comparison with the U.S. Application Ser. No. 928,321. However, the third lens group serves to acceptably compensate for the various aberrations generated between the first and second lens groups by the lens unit composed, in order from the object, of the positive lens having the large curvature convex surface on the image directed to the image and the adjacent negative lens.

If the lower limit of Condition (5) is exceeded, it is impossible to acceptably compensate for the various aberrations generated between the first and second lens groups. In order to compensate for the various aberrations generated between the first and second lens groups, the size of the lens system is inevitably enlarged.

Exceeding the upper limit, not only the lens power of the first positive lens increases, but also the negative lens power of the next lens unit is excessive. Therefore, it is difficult to compensate for spherical aberration, field curvature aberration and the like with good balance to distortion aberration. This leads to the variation and increase of the various aberrations in response to the variation of the overall focal length.

Condition (6) cooperates with Condition (5). When the upper limit of Condition (6) is exceeded, the aerial spaces between the adjacent lens surfaces each having a large curvature which confront to each other is overly excessive. As a result, compensation of spherical aberration, astigmatism, field curvature aberration and the like with good balance to distortion aberration becomes difficult, and prevention of variation and increase of the various aberrations also becomes difficult. In order to adequately compensate for these aberrations, the lens power of the third lens group must be reduced. This leads to enlargement of the size of the lens system.

Condition (7) is provided to prevent the negative Petzval's sum of the third lens group from increasing since the view angle at the wide angle end is according to the present invention wide at 65°. Exceeding the lower limit makes it difficult to compensate for astigmatism, field curvature aberration and the like. One of the desired manners of aberration compensation is to dispose a fixed aperture diaphragm after the third lens group (on the image side), to vary the position of the diaphragm in response to the variation of the overall focal length. This will also open and close the stopping-down aperture for removing flares.

The specific Examples will now be described.

EXAMPLE 1

Figure 2:
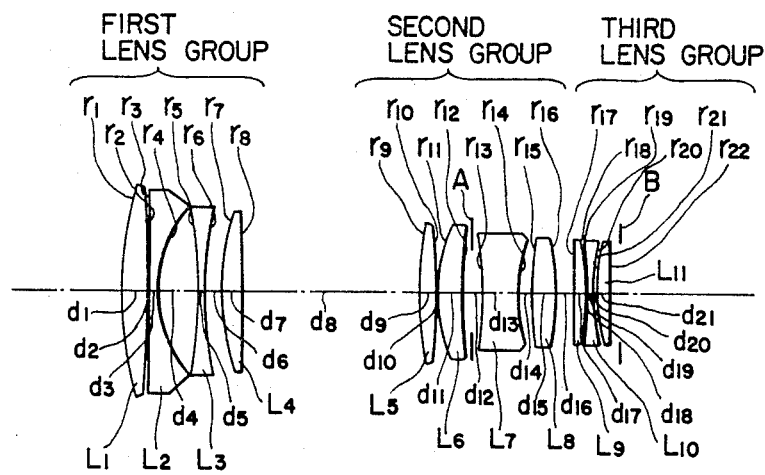
FIG. 2 is a lens construction at the wide angle end, corresponding to a first preferred embodiment shown in EXAMPLE 1.

With reference to FIG. 2, a zoom lens system, in accordance with the present invention having eleven lenses grouped in three lens groups was constructed. The first lens group has four lenses, with the first lens $L_1$ being a positive lens having a convex surface on the object side in the direction of the object. The second and third lenses $L_2$, $L_3$ are negative lenses and the fourth lens $L_4$ is a positive lens having a stronger curvature surface on the object side in the direction of the object than the other surface thereof. The second lens group has four lenses, with the fifth and sixth lenses $L_5$, $L_6$ being positive lenses, the seventh lens $L_7$ being negative lens and the eight lens $L_8$ being a positive lens. A stop diaphragm A is disposed between the sixth lens $L_6$ and the seventh lens $L_7$. The third lens group has three lenses, with the ninth lens $L_9$ being a positive lens having a stronger curvature surface on the image side in the direction of the image than the other surface. The tenth lens $L_{10}$ is a double concave negative lens and the eleventh lens $L_{11}$ is a positive lens having a stronger curvature surface on the object side in the direction of the object than the other surface thereof. A fixed aperture diaphragm B is disposed adjacent the image side of the eleventh $L_{11}$. The radii of curvature $r_1$ to $r_{22}$, the spacing or thickness $d_1$ to $d_{21}$, the referactive indices $n_1$ to $n_{11}$ and Abbe number $\nu_1$ to $\nu_{11}$ of the lenses are given in the following chart.

EXAMPLE 1

| aperture ratio 1 : 4.0 | | overall focal length $f = 70 \sim 136$ | | half of view angle $\omega = 32.6° \sim 17.8°$ | |
|---|---|---|---|---|---|
| Lens | | radius of curvature | spacing and thickness | refractive index at d-line | Abbe No. |
| First Lens Group | $L_1$ | $r_1 = 150.649$ | $d_1 = 8.00$ | $n_1 = 1.72916$ | $\nu_1 = 54.7$ |
| | | $r_2 = -735.300$ | $d_2 = 0.20$ | | |
| | $L_2$ | $r_3 = -5269.610$ | $d_3 = 3.00$ | $n_2 = 1.83400$ | $\nu_2 = 37.2$ |
| | | $r_4 = 44.106$ | $d_4 = 13.29$ | | |
| | $L_3$ | $r_5 = -203.686$ | $d_5 = 2.80$ | $n_3 = 1.60311$ | $\nu_3 = 60.7$ |
| | | $r_6 = 178.820$ | $d_6 = 5.36$ | | |
| | $L_4$ | $r_7 = 83.982$ | $d_7 = 6.50$ | $n_4 = 1.80518$ | $\nu_4 = 25.4$ |
| | | $r_8 = 833.236$ | $d_8 = 61.12$ | | |
| Second Lens Group | $L_5$ | $r_9 = 97.607$ | $d_9 = 6.20$ | $n_5 = 1.77250$ | $\nu_5 = 49.6$ |
| | | $r_{10} = -208.329$ | $d_{10} = 0.20$ | | |
| | $L_6$ | $r_{11} = 51.744$ | $d_{11} = 8.43$ | $n_6 = 1.71300$ | $\nu_6 = 53.9$ |
| | | $r_{12} = 128.585$ | $d_{12} = 7.00$ | | |
| | $L_7$ | $r_{13} = -173.199$ | $d_{13} = 12.00$ | $n_7 = 1.80518$ | $\nu_7 = 25.4$ |
| | | $r_{14} = 44.022$ | $d_{14} = 5.12$ | | |
| | $L_8$ | $r_{15} = 132.122$ | $d_{15} = 8.46$ | $n_8 = 1.67000$ | $\nu_8 = 57.4$ |
| | | $r_{16} = -75.081$ | $d_{16} = 5.75$ | | |
| Third Lens Group | $L_9$ | $r_{17} = -3077.663$ | $d_{17} = 4.00$ | $n_9 = 1.57845$ | $\nu_9 = 41.5$ |
| | | $r_{18} = -70.825$ | $d_{18} = 0.20$ | | |
| | $L_{10}$ | $r_{19} = -98.250$ | $d_{19} = 2.00$ | $n_{10} = 1.81600$ | $\nu_{10} = 46.6$ |
| | | $r_{20} = 65.844$ | $d_{20} = 1.20$ | | |
| | $L_{11}$ | $r_{21} = 94.611$ | $d_{21} = 4.50$ | $n_{11} = 1.80400$ | $\nu_{11} = 46.6$ |
| | | $r_{22} = -302.170$ | | | |

| OVERALL FOCAL LENGTH f | 70 | 100 | 136 |
|---|---|---|---|
| $d_8$ | 61.12 | 24.05 | 1.10 |

EXAMPLE 1-continued

| Lens | aperture ratio 1 : 4.0 radius of curvature | overall focal length f = 70 ~ 136 spacing and thickness | half of view angle $\omega = 32.6° \sim 17.8°$ refractive index at d-line | Abbe No. |
|---|---|---|---|---|
| $d_{16}$ | 5.75 | 3.30 | 1.01 | |

$\dfrac{f_W}{f_{WIII}} = 1.128$ $\dfrac{f_W}{|f_{III}|} = 0.0944$

ZOOM MODE $K_1(f) = -0.0300 =$ constant
$K_2(f) = 1.0913 =$ constant
$\Delta X_{III}(f) = -0.0300 \Delta X_I(f) + 1.0913 \Delta X_{II}(f)$ $\dfrac{\Delta X_{II}(T)}{\Delta X_{I}(T)} = 1.099$ The stop diaphragm is disposed 3.50 after the twelfth lens surface. The fixed aperture diaphragm is disposed l(f) after the twenty-second surface and is movable in response to the variation of the overall focal length.

$\dfrac{f_W}{f_{III\,1}} = 0.5588$ $\dfrac{l_{W1}}{f_W} \; 0.00286$ $N_{III\,2} = 1.81600$

| OVERALL FOCAL LENGTH f | 70 | 100 | 136 |
|---|---|---|---|
| l(f) | 3.00 | 14.98 | 24.95 |

The diameter of the fixed aperture diaphragm is 18.00.

Figure 3A:
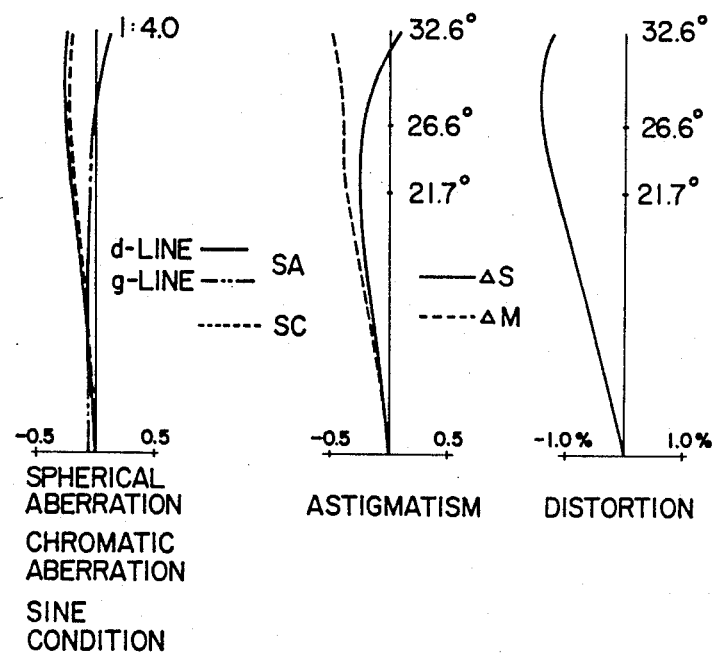
FIGS. 3(a), 3(b) and 3(c) are graphs plotting the aberration curves obtained at the wide angle, middle angle, and narrow angle positions, respectively, of the zoom lens system according to EXAMPLE 1.
Figure 3B:
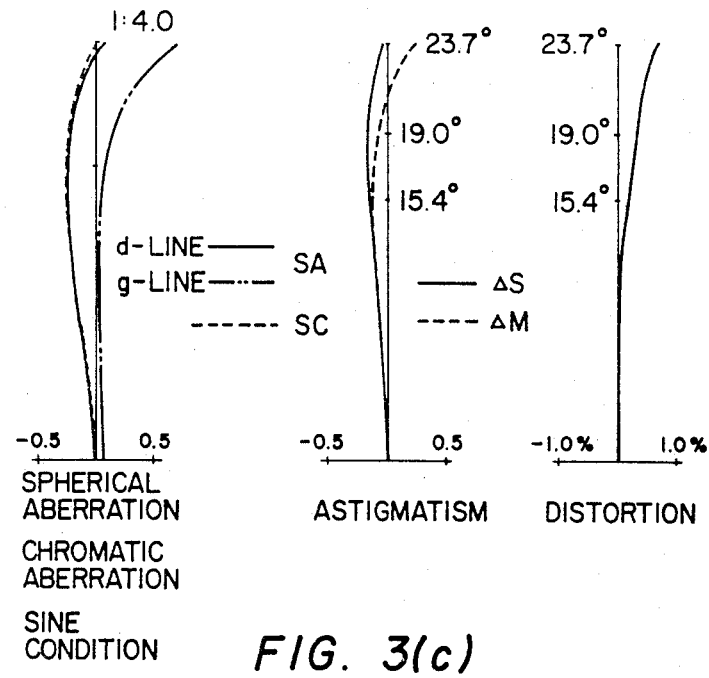
Figure 3C:
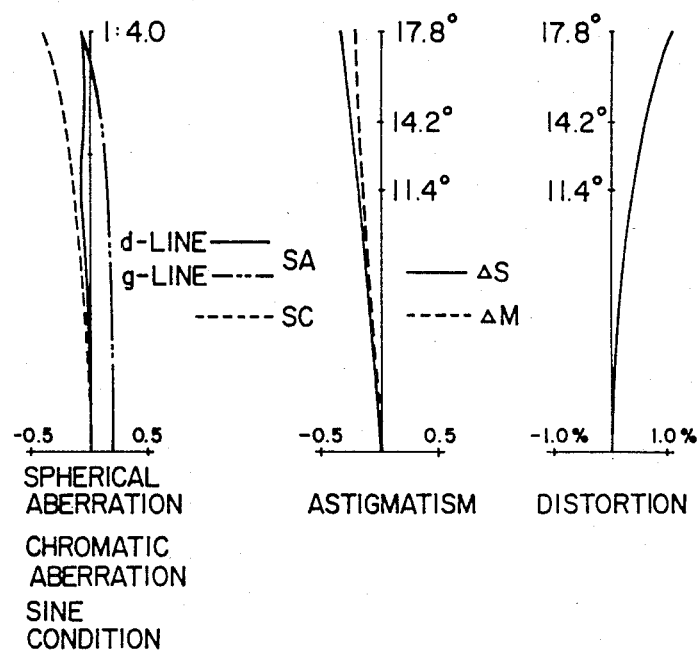

FIGS. 3(a), 3(b) and 3(c) plot, respectively, the spherical and chromatic aberrations and sine condition, the astigmatism, and the distortion of the zoom lens system of EXAMPLE 1 of the present invention at the wide angle, middle angle, and narrow angle positions, respectively.

EXAMPLE 2

Figure 4:
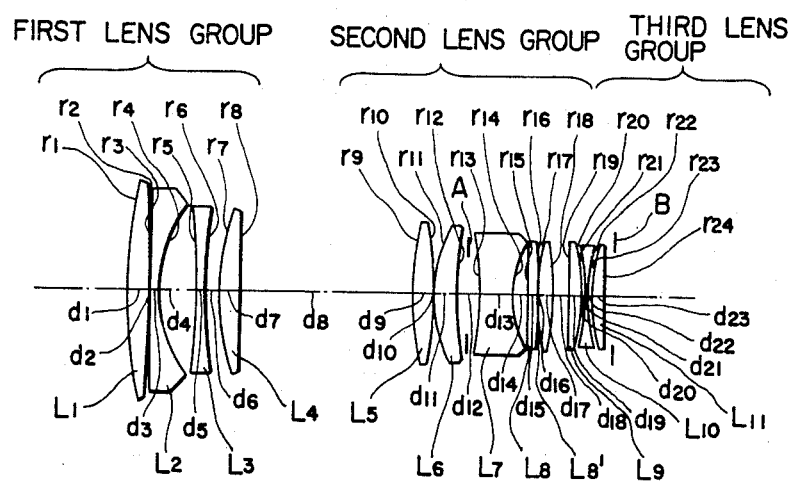
FIG. 4 is a lens construction at the wide angle end, corresponding to a second preferred embodiment shown in EXAMPLE 2.

FIG. 4 shows a zoom lens system having substantially the same overall structure as the zoom lens system of EXAMPLE 1. The difference between the construction of EXAMPLES 1 and 2 is that an additional positive lens $L_{8'}$ is inserted after the eighth lens $L_8$ in EXAMPLE 2. This zoom lens system was constructed according to the following parameters:

EXAMPLE 2

| | Lens | | aperture ratio 1:4.0 radius of curvature | overall focal length f = 70 ~ 136 spacing and thickness | half of view angle $\omega = 32.5° \sim 17.8°$ refractive index at d-line | Abbe No. |
|---|---|---|---|---|---|---|
| First Lens Group | $L_1$ | | $r_1 = 168.330$ | $d_1 = 8.00$ | $n_1 = 1.72916$ | $\nu_1 = 54.7$ |
| | | | $r_2 = -782.774$ | $d_2 = 0.20$ | | |
| | $L_2$ | | $r_3 = 2715.789$ | $d_3 = 3.00$ | $n_2 = 1.83400$ | $\nu_2 = 37.2$ |
| | | | $r_4 = 43.959$ | $d_4 = 13.29$ | | |
| | $L_3$ | | $r_5 = -208.971$ | $d_5 = 2.80$ | $n_3 = 1.60311$ | $\nu_3 = 60.7$ |
| | | | $r_6 = 185.614$ | $d_6 = 5.49$ | | |
| | $L_4$ | | $r_7 = 84.033$ | $d_7 = 6.50$ | $n_4 = 1.80518$ | $\nu_4 = 25.4$ |
| | | | $r_8 = 775.489$ | $d_8 = 60.36$ | | |
| Second Lens Group | $L_5$ | | $r_9 = 95.906$ | $d_9 = 6.20$ | $n_5 = 1.77250$ | $\nu_5 = 49.6$ |
| | | | $r_{10} = -216.111$ | $d_{10} = 0.20$ | | |
| | $L_6$ | | $r_{11} = 51.461$ | $d_{11} = 8.45$ | $n_6 = 1.71300$ | $\nu_6 = 53.9$ |
| | | | $r_{12} = 124.383$ | $d_{12} = 7.00$ | | |
| | $L_7$ | | $r_{13} = -176.030$ | $d_{13} = 12.42$ | $n_7 = 1.80518$ | $\nu_7 = 25.4$ |
| | | | $r_{14} = 44.197$ | $d_{14} = 4.70$ | | |
| | $L_8$ | | $r_{15} = -1124.508$ | $d_{15} = 4.00$ | $n_8 = 1.65160$ | $\nu_8 = 58.6$ |
| | | | $r_{16} = -179.493$ | $d_{16} = 0.20$ | | |
| | $L_{8'}$ | | $r_{15'} = 175.463$ | $d_{15'} = 5.00$ | $n_{8'} = 1.62041$ | $\nu_{8'} = 60.3$ |
| | | | $r_{16'} = -76.901$ | $d_{16'} = 5.86$ | | |

EXAMPLE 2-continued

| | | | | | |
|---|---|---|---|---|---|
| Third Lens Group | $L_9$ | $r_{17} = -373.767$ | $d_{17} = 4.00$ | $n_{10} = 1.59551$ | $\nu_9 = 39.2$ |
| | | $r_{18} = -71.425$ | $d_{18} = 0.20$ | | |
| | $L_{10}$ | $r_{19} = -102.632$ | $d_{19} = 2.00$ | $n_{11} = 1.81600$ | $\nu_{10} = 46.6$ |
| | | $r_{20} = 66.416$ | $d_{20} = 1.20$ | | |
| | $L_{11}$ | $r_{21} = 90.267$ | $d_{21} = 4.50$ | $n_{12} = 1.80400$ | $\nu_{11} = 46.6$ |
| | | $r_{22} = -374.321$ | | | |

| OVERALL FOCAL LENGTH f | 70 | 100 | 136 |
|---|---|---|---|
| $d_8$ | 60.36 | 23.56 | 1.08 |
| $d_{16'}$ | 5.86 | 4.16 | 1.02 |

$$\frac{f_W}{f_{W\,I\,II}} = 1.202$$

$$\frac{f_W}{|f_{W\,III}|} = 0.1559$$

ZOOM MODE  $K_1(f) = 0.04561 = $ constant
$K_2(f) = 1.1081 = $ constant
$\Delta X_{III}(f) = 0.04561\,\Delta X_I(f) + 1.1081\Delta X_{II}(f)$ $$\frac{\Delta X_{III}(T)}{\Delta X_{II}(T)} = 1.099$$

$$\frac{f_W}{f_{III\,1}} = 0.4744$$

$$\frac{l_{III\,1}}{f_W} = 0.00286$$

$N_{III\,2} = 1.81600$

The stop diaphragm is disposed 3.50 after the twelfth lens surface. The fixed aperture diaphragm is disposed l(f) after the final lens surface and is movable in response to the variation of the overall focal length.

| OVERALL FOCAL LENGTH f | 70 | 100 | 136 |
|---|---|---|---|
| l(f) | 3.00 | 15.17 | 24.96 |

The diameter of the fixed aperture diaphragm is 18.00.

Figure 5A:
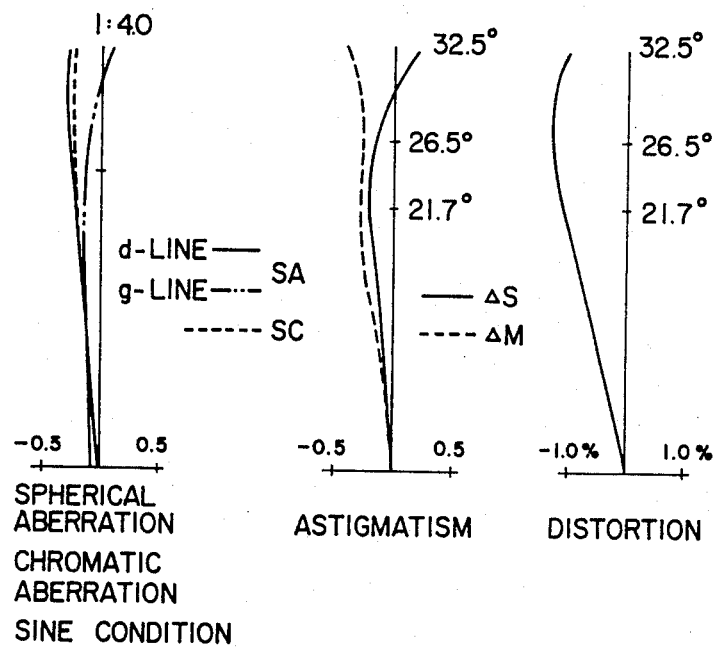
FIGS. 5(a), 5(b) and 5(c) are graphs plotting the aberration curves obtained at the wide angle, middle angle, and narrow angle positions, respectively, of the zoom lens system according to EXAMPLE 2.
Figure 5B:
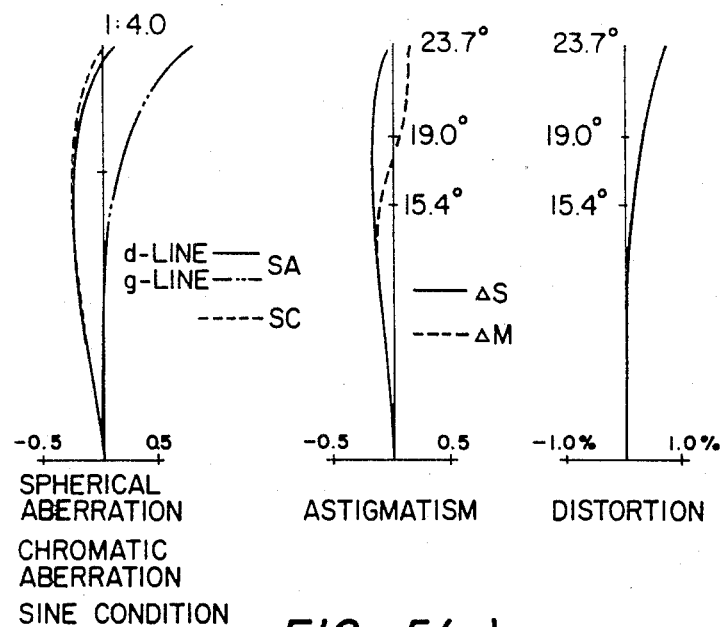
Figure 5C:
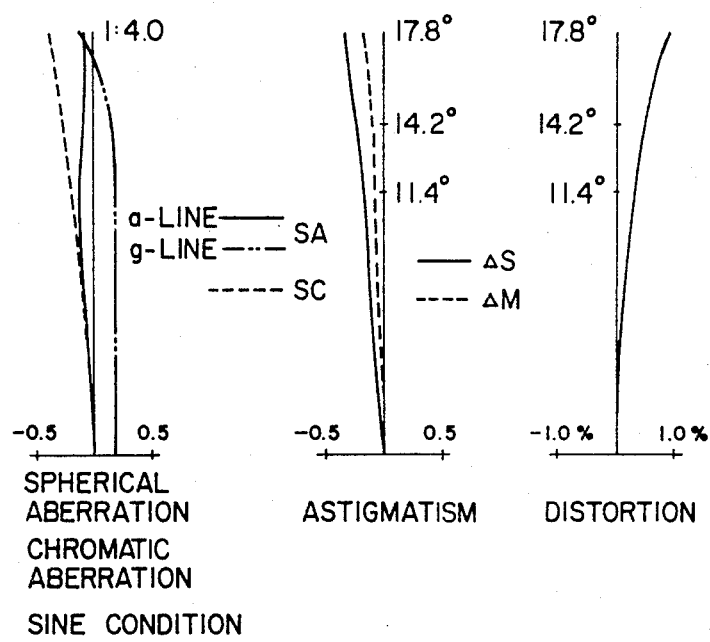

FIGS. 5(a), 5(b) and 5(c) plot, respectively, the spherical and chromatic aberrations and sine condition, the astigmatism, and the distortion of the zoom lens system of EXAMPLE 2 of the present invention at the wide angle, middle angle, and narrow angle positions, respectively.

EXAMPLE 3

Figure 6:
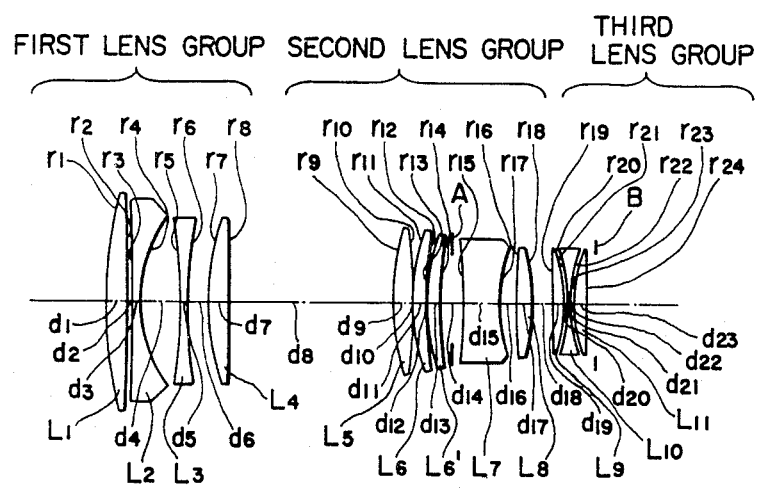
FIG. 6 is a lens construction at the wide angle end, corresponding to a third preferred embodiment shown in EXAMPLE 3.

FIG. 6 shows a zoom lens system having substantially the same overall structure as the zoom lens system of EXAMPLE 1. The difference between the constructions of EXAMPLES 1 and 3 is that an additional positive lens $L_{6'}$ is inserted after the sixth lens $L_6$ in EXAMPLE 3. This zoom lens system was constructed according to the following parameters:

EXAMPLE 3

| | | aperture ratio 1:4.0 | overall focal length f = 70 ~ 136 | half of view angle $\omega = 32.5° \sim 17.8°$ | |
|---|---|---|---|---|---|
| | Lens | radius of curvature | spacing and thickness | refractive index at d-line | Abbe No. |
| First Lens Group | $L_1$ | $r_1 = 165.272$ | $d_1 = 8.00$ | $n_1 = 1.72916$ | $\nu_1 = 54.7$ |
| | | $r_2 = -631.478$ | $d_2 = 0.20$ | | |
| | $L_2$ | $r_3 = -6022.471$ | $d_3 = 3.00$ | $n_2 = 1.83400$ | $\nu_2 = 37.2$ |
| | | $r_4 = 44.679$ | $d_4 = 13.29$ | | |
| | $L_3$ | $r_5 = -189.393$ | $d_5 = 2.80$ | $n_3 = 1.60311$ | $\nu_3 = 60.7$ |
| | | $r_6 = 196.680$ | $d_6 = 6.62$ | | |
| | $L_4$ | $r_7 = 88.636$ | $d_7 = 6.50$ | $n_4 = 1.80518$ | $\nu_4 = 25.4$ |
| | | $r_8 = 947.836$ | $d_8 = 59.81$ | | |
| | $L_5$ | $r_9 = 85.758$ | $d_9 = 6.00$ | $n_5 = 1.77250$ | $\nu_5 = 49.6$ |
| | | $r_{10} = -380.923$ | $d_{10} = 0.20$ | | |

EXAMPLE 3 -continued

| | | | | | |
|---|---|---|---|---|---|
| Second Lens Group | $L_6$ | $r_{11} = 80.988$ | $d_{11} = 4.30$ | $n_6 = 1.67000$ | $\nu_6 = 57.4$ |
| | | $r_{12} = 136.517$ | $d_{12} = 0.20$ | | |
| | $L_{6'}$ | $r_{11'} = 60.031$ | $d_{11'} = 4.20$ | $n_{6'} = 1.69680$ | $\nu_{6'} = 55.5$ |
| | | $r_{12'} = 113.839$ | $d_{12'} = 8.03$ | | |
| | $L_7$ | $r_{13} = -182.989$ | $d_{13} = 12.00$ | $n_7 = 1.80518$ | $\nu_7 = 25.4$ |
| | | $r_{14} = 44.920$ | $d_{14} = 6.40$ | | |
| | $L_8$ | $r_{15} = 189.550$ | $d_{15} = 5.00$ | $n_8 = 1.67000$ | $\nu_8 = 57.4$ |
| | | $r_{16} = -70.132$ | $d_{16} = 7.07$ | | |
| Third Lens Group | $L_9$ | $r_{17} = 385.777$ | $d_{17} = 4.20$ | $n_9 = 1.56732$ | $\nu_9 = 42.8$ |
| | | $r_{18} = -74.063$ | $d_{18} = 0.20$ | | |
| | $L_{10}$ | $r_{19} = -95.217$ | $d_{19} = 2.00$ | $n_{10} = 1.81600$ | $\nu_{10} = 46.6$ |
| | | $r_{20} = 60.356$ | $d_{20} = 1.20$ | | |
| | $L_{11}$ | $r_{21} = 76.829$ | $d_{21} = 4.50$ | $n_{11} = 1.80400$ | $\nu_{11} = 46.6$ |
| | | $r_{22} = -670.373$ | | | |

| OVERALL FOCAL LENGTH f | 70 | 100 | 136 |
|---|---|---|---|
| $d_8$ | 59.81 | 23.57 | 1.09 |
| $d_{16}$ | 7.07 | 3.65 | 1.01 |

$$\frac{f_W}{f_{W\,III}} = 1.097$$

$$\frac{f_W}{|f_{III}|} = 0.0754$$

ZOOM MODE   $K_1(f) = -0.06939 = $ constant
$K_2(f) = 1.1098 = $ constant
$\Delta X_{III}(f) = -0.06939 \Delta X_I(f) + 1.1098 \Delta X_{II}(f)$ $$\frac{\Delta X_{III}(T)}{\Delta X_{II}(T)} = 1.123$$

$$\frac{f_W}{f_{III\,1}} = 0.6370$$

$$\frac{l_{III\,1}}{f_W} = 0.00286$$

$N_{III\,2} = 1.81600$

The stop diaphragm is disposed 4.53 after the rear surface of the lens $L_{6'}$. The fixed aperture diaphragm is disposed l(f) after the final lens surface and is movable in response to the variation of the overall focal length.

| OVERALL FOCAL LENGTH f | 70 | 100 | 136 |
|---|---|---|---|
| l(f) | 3.00 | 15.16 | 24.95 |

The diameter of the fixed aperture diaphragm is 18.00.

Figure 7A:
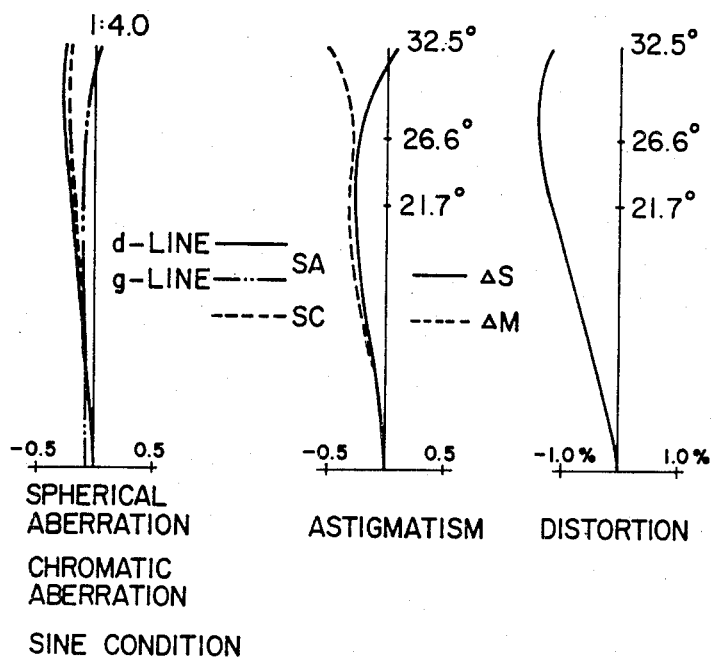

FIGS. 7(a), 7(b) and 7(c) plot, respectively, the spherical and chromatic aberrations, sine condition, the astigmatism, and the distortion of the zoom lens system of EXAMPLE 3 of the present invention at the wide angle, middle angle and narrow angle positions, respectively.

EXAMPLE 4

Figure 8:
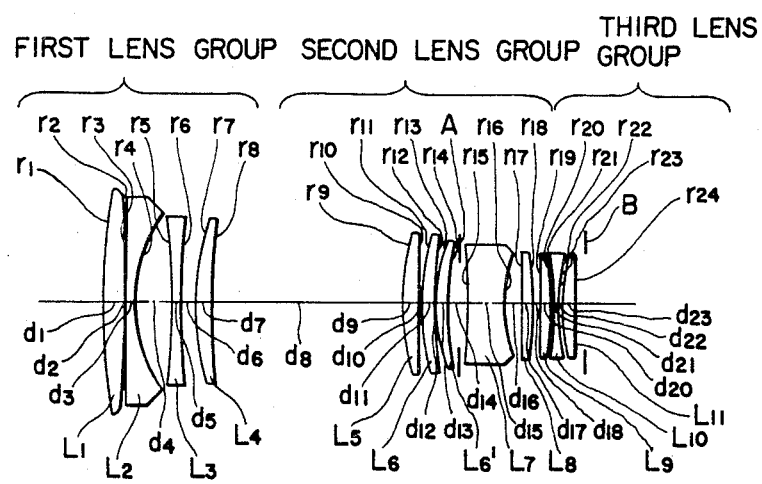
FIG. 8 is a lens construction at the wide angle end, corresponding to a fourth preferred embodiment shown in EXAMPLE 4.

FIG. 8 shows a zoom lens system having the same overall structure as the zoom lens system of EXAMPLE 3. However, this zoom lens system was constructed according to the following parameters:

EXAMPLE 4

| | aperture ratio 1:4.0 | overall focal length $f = 70 \sim 136$ | | half of view angle $\omega = 32.6° \sim 17.8°$ | |
|---|---|---|---|---|---|
| Lens | radius of curvature | spacing and thickness | refractive index at d-line | | Abbe No. |
| $L_1$ | $r_1 = 189.551$ | $d_1 = 8.00$ | $n_1 = 1.72916$ | | $\nu_1 = 54.7$ |
| | $r_2 = -919.436$ | $d_2 = 0.20$ | | | |

EXAMPLE 4-continued

| | | | | | |
|---|---|---|---|---|---|
| First Lens Group | $L_2$ | $r_3 = 1170.419$ | $d_3 = 3.00$ | $n_2 = 1.83400$ | $\nu_2 = 37.2$ |
| | | $r_4 = 45.376$ | $d_4 = 13.29$ | | |
| | $L_3$ | $r_5 = -213.975$ | $d_5 = 2.80$ | $n_3 = 1.60311$ | $\nu_3 = 60.7$ |
| | | $r_6 = 246.255$ | $d_6 = 4.95$ | | |
| | $L_4$ | $r_7 = 82.920$ | $d_7 = 6.50$ | $n_4 = 1.80518$ | $\nu_4 = 25.4$ |
| | | $r_8 = 476.180$ | $d_8 = 65.46$ | | |
| Second Lens Group | $L_5$ | $r_9 = 80.606$ | $d_9 = 6.00$ | $n_5 = 1.77250$ | $\nu_5 = 49.6$ |
| | | $r_{10} = -448.217$ | $d_{10} = 0.20$ | | |
| | $L_6$ | $r_{11} = 78.398$ | $d_{11} = 4.30$ | $n_6 = 1.67000$ | $\nu_6 = 57.4$ |
| | | $r_{12} = 133.508$ | $D_{12} = 0.20$ | | |
| | $L_{6'}$ | $r_{11'} = 58.415$ | $d_{11'} = 4.20$ | $n_{6'} = 1.69680$ | $\nu_{6'} = 55.5$ |
| | | $r_{12'} = 107.304$ | $d_{12'} = 7.28$ | | |
| | $L_7$ | $r_{13} = -193.509$ | $d_{13} = 12.00$ | $n_7 = 1.80518$ | $\nu_7 = 25.4$ |
| | | $r_{14} = 44.121$ | $d_{14} = 6.16$ | | |
| | $L_8$ | $r_{15} = 246.478$ | $d_{15} = 5.00$ | $n_8 = 1.67000$ | $\nu_8 = 57.4$ |
| | | $r_{16} = -65.697$ | $d_{16} = 2.04$ | | |
| Third Lens Group | $L_9$ | $r_{17} = 5400.802$ | $d_{17} = 4.20$ | $n_9 = 1.59551$ | $\nu_9 = 39.2$ |
| | | $r_{18} = -79.115$ | $d_{18} = 0.20$ | | |
| | $L_{10}$ | $r_{19} = -89.330$ | $d_{19} = 2.00$ | $n_{10} = 1.81600$ | $\nu_{10} = 46.6$ |
| | | $r_{20} = 61.503$ | $d_{20} = 1.20$ | | |
| | $L_{11}$ | $r_{21} = 75.508$ | $d_{21} = 4.50$ | $n_{11} = 1.80400$ | $\nu_{11} = 46.6$ |
| | | $r_{22} = -323.125$ | | | |

| OVERALL FOCAL LENGTH f | 70 | 100 | 136 |
|---|---|---|---|
| $d_8$ | 65.46 | 25.65 | 1.06 |
| $d_{16}$ | 2.04 | 2.04 | 2.04 |

$$\frac{f_W}{f_{WIII}} = 1.135$$

$$\frac{f_W}{|f_{III}|} = 0.0950$$

ZOOM MODE  $K_1(f) = 0.0 =$ constant
$K_2(f) = 1.0 =$ constant
$\Delta X_{III}(f) = \Delta X_{II}(f)$ $$\frac{\Delta X_{III}(T)}{\Delta X_{II}(T)} = 1.0$$

$$\frac{f_W}{f_{III\,1}} = 0.5345$$

$$\frac{l_{III\,1}}{f_W} = 0.00286$$

$N_{III\,2} = 1.81600$

The stop diaphragm is disposed 3.78 after the rear surface of the lens $L_{6'}$. The fixed aperture diaphragm is disposed l(f) after the final lens surface and is movable in response to the variation of the overall focal length.

| OVERALL FOCAL LENGTH f | 70 | 100 | 136 |
|---|---|---|---|
| l(f) | 3.00 | 14.41 | 24.97 |

The diameter of the fixed aperture diaphragm is 18.00.

Figure 9A:
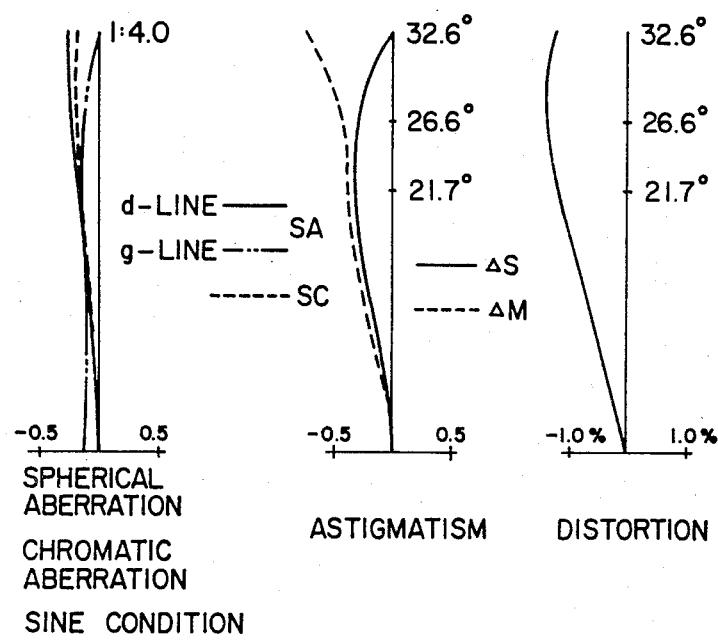
FIGS. 9(a), 9(b) and 9(c) are graphs plotting the aberration curves obtained at the wide angle, middle angle, and narrow angle positions of the zoom lens system according to EXAMPLE 4.
Figure 9B:
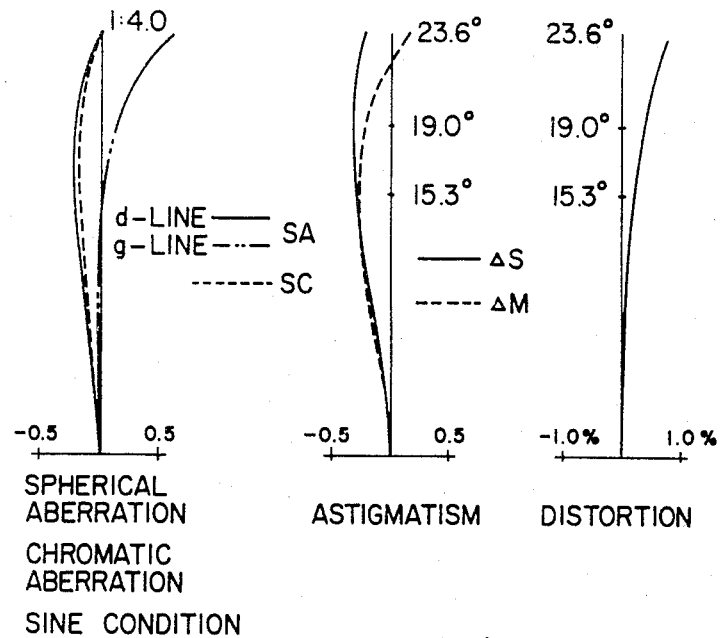
Figure 9C:
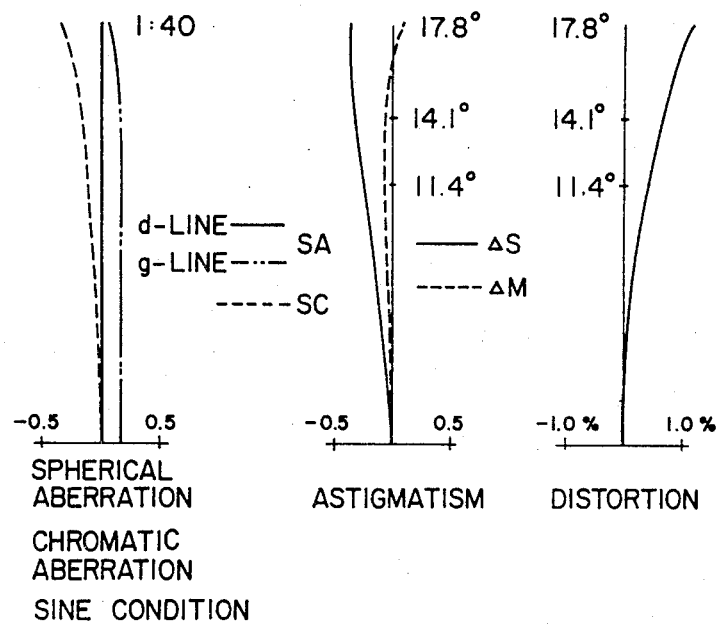

FIGS. 9(a), 9(b) and 9(c) plot, respectively, the spherical and chromatic aberrations, sine condition, the astigmatism, and the distortion of the zoom lens system of EXAMPLE 4 of the present invention at the wide angle, middle angle and narrow angle positions, respectively.

What is claimed is:

1. A wide angle zoom lens system exhibiting a small distortion aberration, said zoom lens system comprising, in order from the object side, a front lens group having a negative focal length and a rear lens group having a positive focal length, said front lens group being a first lens group and said rear lens group being further grouped into a second lens group having a positive focal length and a third lens group having a negative focal length, said first, second and third lens groups being axially displaceable to maintain the image focus plane at a constant position, said zoom lens system satisfying the following conditions:

$$1.0 < \frac{f_W}{f_{W I\, II}} < 1.35 \quad (1)$$

$$0.0 < \frac{f_W}{|f_{III}|} < 0.35 \quad (2)$$

$$1.0 \leq \frac{\Delta X_{III}(T)}{\Delta X_{II}(T)} < 1.2 \quad (3)$$

$$0.9 < \frac{\Delta X_{III}(f)}{\Delta X_{II}(f)} < 1.3 \quad (4)$$

$$0.3 < \frac{f_W}{f_{III1}} < 1.0 \quad (5)$$

$$0.0 \leq \frac{l_{III\,1}}{f_W} < 0.02 \quad (6)$$

$$1.67 < N_{III2} \quad (7)$$

where:

$f_W$ is the overall focal length at the wide angle end;
$f_{W III}$ is the resultant focal length of the first and second lens groups at the wide angle end;
$f_{III}$ is the focal length of the third lens group;
$\Delta X_{II}(T)$ is the amount of movement of the second lens group at the telephoto end from the wide angle end;
$\Delta X_{III}(T)$ is the amount of movement of the third lens group at the telephoto end from the wide angle end;
$\Delta X_{II}(f)$ is the amount of movement of the second lens group at a overall focal length (f) from the wide angle end;
$\Delta X_{III}(f)$ is the amount of movement of the third lens group at a overall focal length (f) from the wide angle end;
$f_{III1}$ is the focal length of the first positive lens within the third lens group;
$l_{III1}$ is the aerial space between the first positive lens and the first negative lens within the third lens group; and
$N_{III2}$ is the refractive index on d-line of the first negative lens within the third lens group, the lens system comprising, in order from the object side, the first lens group having four lenses, with a first lens $L_1$ being a positive lens having a convex surface on the object side in the direction of the object, second and third lenses $L_2$, $L_3$ being negative lenses and the fourth lens $L_4$ being a positive lens having a stronger curvature surface on the object side in the direction of the object than the opposite surface thereof, the second lens group having four lenses, with fifth and sixth lenses $L_5$, $L_6$ being positive lenses, a seventh lens $L_7$ being a negative lens and an eighth lens $L_8$ being a positive lens, and the third lens group having three lenses, a ninth lens $L_9$ being a positive lens having a stronger curvature surface on the image side in the direction of the image than the opposite surface thereof, a tenth lens $L_{10}$ being a double concave negative lens and an eleventh lens $L_{11}$ being a positive lens having a stronger curvature surface on the object side in the direction of the object than the opposite surface thereof, the lens system further defined by the following parameters:

| | | aperture ratio 1 : 4.0 | overall focal length $f = 70 \sim 136$ | half of view angle $\omega = 32.6° \sim 17.8°$ | |
|---|---|---|---|---|---|
| | Lens | radius of curvature | spacing and thickness | refractive index at d-line | Abbe No. |
| First Lens Group | $L_1$ | $r_1 =$ 150.649<br>$r_2 =$ −735.300 | $d_1 =$ 8.00<br>$d_2 =$ 0.20 | $n_1 =$ 1.72916 | $\nu_1 =$ 54.7 |
| | $L_2$ | $r_3 =$ −5269.610<br>$r_4 =$ 44.106 | $d_3 =$ 3.00<br>$d_4 =$ 13.29 | $n_2 =$ 1.83400 | $\nu_2 =$ 37.2 |
| | $L_3$ | $r_5 =$ −203.686<br>$r_6 =$ 178.820 | $d_5 =$ 2.80<br>$d_6 =$ 5.36 | $n_3 =$ 1.60311 | $\nu_3 =$ 60.7 |
| | $L_4$ | $r_7 =$ 83.982<br>$r_8 =$ 833.236 | $d_7 =$ 6.50<br>$d_8 =$ 61.12 | $n_4 =$ 1.80518 | $\nu_4 =$ 25.4 |
| Second Lens Group | $L_5$ | $r_9 =$ 97.607<br>$r_{10} =$ −208.329 | $d_9 =$ 6.20<br>$d_{10} =$ 0.20 | $n_5 =$ 1.77250 | $\nu_5 =$ 49.6 |
| | $L_6$ | $r_{11} =$ 51.744<br>$r_{12} =$ 128.585 | $d_{11} =$ 8.43<br>$d_{12} =$ 7.00 | $n_6 =$ 1.71300 | $\nu_6 =$ 53.9 |
| | $L_7$ | $r_{13} =$ −173.199<br>$r_{14} =$ 44.022 | $d_{13} =$ 12.00<br>$d_{14} =$ 5.12 | $n_7 =$ 1.80518 | $\nu_7 =$ 25.4 |
| | $L_8$ | $r_{15} =$ 132.122<br>$r_{16} =$ −75.081 | $d_{15} =$ 8.46<br>$d_{16} =$ 5.75 | $n_8 =$ 1.67000 | $\nu_8 =$ 57.4 |
| Third Lens Group | $L_9$ | $r_{17} =$ −3077.663<br>$r_{18} =$ −70.825 | $d_{17} =$ 4.00<br>$d_{18} =$ 0.20 | $n_9 =$ 1.57845 | $\nu_9 =$ 41.5 |
| | $L_{10}$ | $r_{19} =$ −98.250<br>$r_{20} =$ 65.844 | $d_{19} =$ 2.00<br>$d_{20} =$ 1.20 | $n_{10} =$ 1.81600 | $\nu_{10} =$ 46.6 |
| | $L_{11}$ | $r_{21} =$ 94.611<br>$r_{22} =$ −302.170 | $d_{21} =$ 4.50 | $n_{11} =$ 1.80400 | $\nu_{11} =$ 46.6 |
| OVERALL FOCAL LENGTH f | | | 70 | 100 | 136 |
| $d_8$ | | | 61.12 | 24.05 | 1.10 |
| $d_{16}$ | | | 5.75 | 3.30 | 1.01 |

2. A wide angle zoom lens system exhibiting a small distortion aberration, said zoom lens system comprising, in order from the object side, a front lens group having a negative focal length and a rear lens group having a positive focal length, said front lens group being a first lens group and said rear lens group being further grouped into a second lens group having a positive focal length and a third lens group having a negative focal length, said first, second and third lens groups being axially displaceable to maintain the image focus plane at a constant position, said zoom lens system satisfying the following conditions:

$$1.0 < \frac{f_W}{f_{WI\ II}} < 1.35 \quad (1)$$

$$0.0 < \frac{f_W}{|f_{III}|} < 0.35 \quad (2)$$

$$1.0 \leq \frac{\Delta X_{III}(T)}{\Delta X_{II}(T)} < 1.2 \quad (3)$$

$$0.9 < \frac{\Delta X_{III}(f)}{\Delta X_{II}(f)} < 1.3 \quad (4)$$

$$0.3 < \frac{f_W}{f_{III1}} < 1.0 \quad (5)$$

$$0.0 \leq \frac{l_{III\ 1}}{f_W} < 0.02 \quad (6)$$

$$1.67 < N_{III2} \quad (7)$$

where:

$f_W$ is the overall focal length at the wide angle end;

$f_{WIII}$ is the resultant focal length of the first and second lens groups at the wide angle end;

$f_{III}$ is the focal length of the third lens group;

$\Delta X_{II}(T)$ is the amount of movement of the second lens group at the telephoto end from the wide angle end;

$\Delta X_{III}(T)$ is the amount of movement of the third lens group at the telephoto end from the wide angle end;

$\Delta X_{II}(f)$ is the amount of movement of the second lens group at a overall focal length (f) from the wide angle end;

$\Delta X_{III}(f)$ is the amount of movement of the third lens group at a overall focal length (f) from the wide angle end;

$f_{III\ 1}$ is the focal length of the first positive lens within the third lens group;

$l_{III\ 1}$ is the aerial space between the first positive lens and the first negative lens within the third lens group; and $N_{III\ 2}$ is the refractive index on d-line of the first negative lens within the third lens group, the lense system comprising in order from the object side, the first lens group having four lenses, with a first lens $L_1$ being a positive lens having a convex surface on the object side in the direction of the object, second and third lenses $L_2$, $L_3$ being negative lenses and the fourth lens $L_4$ being a positive lens having a stronger curvature surface on the object side in the direction of the object than the opposite surface thereof, the second lens group having five lenses, with fifth and sixth lenses $L_5$, $L_6$ being positive lenses, a seventh lens $L_7$ being a negative lens, an eighth lens $L_8$ being a positive lens, and a lens $L_{8'}$ being a positive lens, and the third lens group having three lenses, a ninth lens $L_9$ being a positive lens having a stronger curvature surface on the image side in the direction of the image than the opposite surface thereof, a tenth lens $L_{10}$ being a double concave negative lens and an eleventh lens $L_{11}$ being a positive lens having a stronger curvature surface on the object side in the direction of the object than the opposite surface thereof, the lens system further defined by the following parameters:

| | Lens | | radius of curvature | spacing and thickness | refractive index at d-line | Abbe No. |
|---|---|---|---|---|---|---|
| | | | aperture ratio 1:4.0 | overall focal length f = 70 ~ 136 | half of view angle ω = 32.5° ~ 17.8° | |
| First Lens Group | $L_1$ | | $r_1 = 168.330$ | $d_1 = 8.00$ | $n_1 = 1.72916$ | $\nu_1 = 54.7$ |
| | | | $r_2 = -782.774$ | $d_2 = 0.20$ | | |
| | $L_2$ | | $r_3 = 2715.789$ | $d_3 = 3.00$ | $n_2 = 1.83400$ | $\nu_2 = 37.2$ |
| | | | $r_4 = 43.959$ | $d_4 = 13.29$ | | |
| | $L_3$ | | $r_5 = -208.971$ | $d_5 = 2.80$ | $n_3 = 1.60311$ | $\nu_3 = 60.7$ |
| | | | $r_6 = 185.614$ | $d_6 = 5.49$ | | |
| | $L_4$ | | $r_7 = 84.033$ | $d_7 = 6.50$ | $n_4 = 1.80518$ | $\nu_4 = 25.4$ |
| | | | $r_8 = 775.489$ | $d_8 = 60.36$ | | |
| Second Lens Group | $L_5$ | | $r_9 = 95.906$ | $d_9 = 6.20$ | $n_5 = 1.77250$ | $\nu_5 = 49.6$ |
| | | | $r_{10} = -216.111$ | $d_{10} = 0.20$ | | |
| | $L_6$ | | $r_{11} = 51.461$ | $d_{11} = 8.45$ | $n_6 = 1.71300$ | $\nu_6 = 53.9$ |
| | | | $r_{12} = 124.383$ | $d_{12} = 7.00$ | | |
| | $L_7$ | | $r_{13} = -176.030$ | $d_{13} = 12.42$ | $n_7 = 1.80518$ | $\nu_7 = 25.4$ |
| | | | $r_{14} = 44.197$ | $d_{14} = 4.70$ | | |
| | $L_8$ | | $r_{15} = -1124.508$ | $d_{15} = 4.00$ | $n_8 = 1.65160$ | $\nu_8 = 58.6$ |
| | | | $r_{16} = -179.493$ | $d_{16} = 0.20$ | | |
| | $L_{8'}$ | | $r_{15'} = 175.463$ | $d_{15'} = 5.00$ | $n_{8'} = 1.62041$ | $\nu_{8'} = 60.3$ |
| | | | $r_{16'} = -76.901$ | $d_{16'} = 5.86$ | | |
| | $L_9$ | | $r_{17} = -373.767$ | $d_{17} = 4.00$ | $n_{10} = 1.59551$ | $\nu_9 = 39.2$ |
| | | | $r_{18} = -71.425$ | $d_{18} = 0.20$ | | |

-continued

|  |  |  |  |  |  |
|---|---|---|---|---|---|
| Third Lens Group | $L_{10}$ | $r_{19} = -102.632$ | $d_{19} = 2.00$ | $n_{11} = 1.81600$ | $\nu_{10} = 46.6$ |
|  |  | $r_{20} = 66.416$ | $d_{20} = 1.20$ |  |  |
|  | $L_{11}$ | $r_{21} = 90.267$ | $d_{21} = 4.50$ | $n_{12} = 1.80400$ | $\nu_{11} = 46.6$ |
|  |  | $r_{22} = -374.321$ |  |  |  |
| OVERALL FOCAL LENGTH f |  |  | 70 | 100 | 136 |
|  | $d_8$ |  | 60.36 | 23.56 | 1.08 |
|  | $d_{16'}$ |  | 5.86 | 4.16 | 1.02 |

3. A wide angle zoom lens system exhibiting a small distortion aberration, said zoom lens system comprising, in order from the object side, a front lens group having a negative focal length and a rear lens group having a positive focal length, said front lens group being a first lens group and said rear lens group being further grouped into a second lens group having a positive focal length and a third lens group having a negative focal length, said first, second and third lens groups being axially displaceable to maintain the image focus plane at a constant position, said zoom lens system satisfying the following conditions:

$$1.0 < \frac{f_W}{f_{WIII}} < 1.35 \quad (1)$$

$$0.0 < \frac{f_W}{|f_{III}|} < 0.35 \quad (2)$$

$$1.0 \leq \frac{\Delta X_{III}(T)}{\Delta X_{II}(T)} < 1.2 \quad (3)$$

$$0.9 < \frac{\Delta X_{III}(f)}{\Delta X_{II}(f)} < 1.3 \quad (4)$$

$$0.3 < \frac{f_W}{f_{III1}} < 1.0 \quad (5)$$

$$0.0 \leq \frac{l_{III1}}{f_W} < 0.02 \quad (6)$$

$$1.67 < N_{III2} \quad (7)$$

where:
$f_W$ is the overall focal length at the wide angle end;
$f_{WIII}$ is the resultant focal length of the first and second lens groups at the wide angle end;
$f_{III}$ is the focal length of the third lens group;
$\Delta X_{II}(T)$ is the amount of movement of the second lens group at the telephoto end from the wide angle end;
$\Delta X_{III}(T)$ is the amount of movement of the third lens group at the telephoto end from the wide angle end;
$\Delta X_{II}(f)$ is the amount of movement of the second lens group at a overall focal length (f) from the wide angle end;
$\Delta X_{III}(f)$ is the amount of movement of the third lens group at a overall focal length (f) from the wide angle end;
$f_{III1}$ is the focal length of the first positive lens within the third lens group;
$l_{III1}$ is the aerial space between the first positive lens and the first negative lens within the third lens group; and
$N_{III2}$ is the refractive index on d-line of the first negative lens within the third lens group, the lens system comprising in order from the object side, the first lens group having four lenses, with a first lens $L_1$ being a positive lens having a convex surface on the object side in the direction of the object, second and third lenses $L_2$, $L_3$ being negative lenses and the fourth lens $L_4$ being a positive lens having a stronger curvature surface on the object side in the direction of the object than the opposite surface thereof, the second lens group having four lenses, with fifth, sixth and an additional lenses $L_5$, $L_6$, $L_{6'}$ being positive lenses, a seventh lens $L_7$ being a negative lens and an eighth lens $L_8$ being a positive lens, and the third lens group having three lenses, a ninth lens $L_9$ being a positive lens having a stronger curvature surface on the image side in the direction of the image than the opposite surface thereof, a tenth lens $L_{10}$ being a double concave negative lens and an eleventh lens $L_{11}$ being a positive lens having a stronger curvature surface on the object side in the direction of the object than the opposite surface thereof, the lens system further defined by the following parameters:

|  | aperture ratio 1:4.0 | overall focal length f = 70 ~ 136 | half of view angle $\omega = 32.5° \sim 17.8°$ |  |  |
|---|---|---|---|---|---|
|  | Lens | radius of curvature | spacing and thickness | refractive index at d-line | Abbe No. |
| First Lens Group | $L_1$ | $r_1 = 165.272$ | $d_1 = 8.00$ | $n_1 = 1.72916$ | $\nu_1 = 54.7$ |
|  |  | $r_2 = -631.478$ | $d_2 = 0.20$ |  |  |
|  | $L_2$ | $r_3 = -6022.471$ | $d_3 = 3.00$ | $n_2 = 1.83400$ | $\nu_2 = 37.2$ |
|  |  | $r_4 = 44.679$ | $d_4 = 13.29$ |  |  |
|  | $L_3$ | $r_5 = -189.393$ | $d_5 = 2.80$ | $n_3 = 1.60311$ | $\nu_3 = 60.7$ |
|  |  | $r_6 = 196.680$ | $d_6 = 6.62$ |  |  |
|  | $L_4$ | $r_7 = 88.636$ | $d_7 = 6.50$ | $n_4 = 1.80518$ | $\nu_4 = 25.4$ |
|  |  | $r_8 = 947.836$ | $d_8 = 59.81$ |  |  |

-continued

| | | | | | |
|---|---|---|---|---|---|
| Second Lens Group | $L_5$ | $r_9 = 85.758$<br>$r_{10} = -380.923$ | $d_9 = 6.00$<br>$d_{10} = 0.20$ | $n_5 = 1.77250$ | $\nu_5 = 49.6$ |
| | $L_6$ | $r_{11} = 80.988$<br>$r_{12} = 136.517$ | $d_{11} = 4.30$<br>$d_{12} = 0.20$ | $n_6 = 1.67000$ | $\nu_6 = 57.4$ |
| | $L_{6'}$ | $r_{11'} = 60.031$<br>$r_{12'} = 113.839$ | $d_{11'} = 4.20$<br>$d_{12'} = 8.03$ | $n_{6'} = 1.69680$ | $\nu_{6'} = 55.5$ |
| | $L_7$ | $r_{13} = -182.989$<br>$r_{14} = 44.920$ | $d_{13} = 12.00$<br>$d_{14} = 6.40$ | $n_7 = 1.80518$ | $\nu_7 = 25.4$ |
| | $L_8$ | $r_{15} = 189.550$<br>$r_{16} = -70.132$ | $d_{15} = 5.00$<br>$d_{16} = 7.07$ | $n_8 = 1.67000$ | $\nu_8 = 57.4$ |
| Third Lens Group | $L_9$ | $r_{17} = 385.777$<br>$r_{18} = -74.063$ | $d_{17} = 4.20$<br>$d_{18} = 0.20$ | $n_9 = 1.56732$ | $\nu_9 = 42.8$ |
| | $L_{10}$ | $r_{19} = -95.217$<br>$r_{20} = 60.356$ | $d_{19} = 2.00$<br>$d_{20} = 1.20$ | $n_{10} = 1.81600$ | $\nu_{10} = 46.6$ |
| | $L_{11}$ | $r_{21} = 76.829$<br>$r_{22} = -670.373$ | $d_{21} = 4.50$ | $n_{11} = 1.80400$ | $\nu_{11} = 46.6$ |

| OVERALL FOCAL LENGTH f | 70 | 100 | 136 |
|---|---|---|---|
| $d_8$ | 59.81 | 23.57 | 1.09 |
| $d_{16}$ | 7.07 | 3.65 | 1.01 |

4. A wide angle zoom lens system exhibiting a small distortion aberration, said zoom lens system comprising, in order from the object side, a front lens group having a negative focal length and a rear lens group having a positive focal length, said front lens group being a first lens group and said rear lens group being further grouped into a second lens group having a positive focal length and a third lens group having a negative focal length, said first, second and third lens groups being axially displaceable to maintain the image focus plane at a constant position, said zoom lens system satisfying the following conditions:

$$1.0 < \frac{f_W}{f_{WIII}} < 1.35 \tag{1}$$

$$0.0 < \frac{f_W}{|f_{III}|} < 0.35 \tag{2}$$

$$1.0 \leq \frac{\Delta X_{III}(T)}{\Delta X_{II}(T)} < 1.2 \tag{3}$$

$$0.9 < \frac{\Delta X_{III}(f)}{\Delta X_{II}(f)} < 1.3 \tag{4}$$

$$0.3 < \frac{f_W}{f_{III 1}} < 1.0 \tag{5}$$

$$0.0 \leq \frac{l_{III 1}}{f_W} < 0.02 \tag{6}$$

$$1.67 < N_{III 2} \tag{7}$$

where:

$f_W$ is the overall focal length at the wide angle end;

$f_{WIII}$ is the resultant focal length of the first and second lens groups at the wide angle end;

$f_{III}$ is the focal length of the third lens group;

$\Delta X_{II}(T)$ is the amount of movement of the second lens group at the telephoto end from the wide angle end;

$\Delta X_{III}(T)$ is the amount of movement of the third lens group at the telephoto end from the wide angle end;

$\Delta X_{II}(f)$ is the amount of movement of the second lens group at a overall focal length (f) from the wide angle end;

$\Delta X_{III}(f)$ is the amount of movement of the third lens group at a overall focal length (f) from the wide angle end;

$f_{III 1}$ is the focal length of the first positive lens within the third lens group;

$l_{III 1}$ is the aerial space between the first positive lens and the first negative lens within the third lens group; and $N_{III 2}$ is the refractive index on d-line of the first negative lens within the third lens group, the lens system comprising, in order from the object side, the first lens group having four lenses, with a first lens $L_1$ being a positive lens having a convex surface on the object side in the direction of the object, second and third lenses $L_2$, $L_3$ being negative lenses and the fourth lens $L_4$ being a positive lens having a stronger curvature surface on the object side in the direction of the object than the opposite surface thereof, the second lens group having four lenses, with fifth, sixth and an additional lenses $L_5$, $L_6$, $L_{6'}$ being positive lenses, a seventh lens $L_7$ being a negative lens and an eighth lens $L_8$ being a positive lens, and the third lens group having three lenses, a ninth lens $L_9$ being a positive lens having a stronger curvature surface on the image side in the direction of the image than the opposite surface thereof, a tenth lens $L_{10}$ being a double concave negative lens and an eleventh lens $L_{11}$ being a positive lens having a stronger curvature surface on the object side in the direction of the object than the opposite surface thereof, the lens system further defined by the following parameters:

| | Lens | radius of curvature | spacing and thickness | refractive index at d-line | Abbe No. |
|---|---|---|---|---|---|
| | | aperture ratio 1:4.0 | overall focal length f=70~136 | half of view angle ω=32.6°~17.8° | |
| First Lens Group | $L_1$ | $r_1 = 189.551$ | $d_1 = 8.00$ | $n_1 = 1.72916$ | $\nu_1 = 54.7$ |
| | | $r_2 = 919.436$ | $d_2 = 0.20$ | | |
| | $L_2$ | $r_3 = 1170.419$ | $d_3 = 3.00$ | $n_2 = 1.83400$ | $\nu_2 = 37.2$ |
| | | $r_4 = 45.376$ | $d_4 = 13.29$ | | |
| | $L_3$ | $r_5 = -213.975$ | $d_5 = 2.80$ | $n_3 = 1.60311$ | $\nu_3 = 60.7$ |
| | | $r_6 = 246.255$ | $d_6 = 4.95$ | | |
| | $L_4$ | $r_7 = 82.920$ | $d_7 = 6.50$ | $n_4 = 1.80518$ | $\nu_4 = 25.4$ |
| | | $r_8 = 476.180$ | $d_8 = 65.46$ | | |
| Second Lens Group | $L_5$ | $r_9 = 80.606$ | $d_9 = 6.00$ | $n_5 = 1.77250$ | $\nu_5 = 49.6$ |
| | | $r_{10} = -448.217$ | $d_{10} = 0.20$ | | |
| | $L_6$ | $r_{11} = 78.398$ | $d_{11} = 4.30$ | $n_6 = 1.67000$ | $\nu_6 = 57.4$ |
| | | $r_{12} = 133.508$ | $d_{12} = 0.20$ | | |
| | $L_{6'}$ | $r_{11'} = 58.415$ | $d_{11'} = 4.20$ | $n_{6'} = 1.69680$ | $\nu_{6'} = 55.5$ |
| | | $r_{12'} = 107.304$ | $d_{12'} = 7.28$ | | |
| | $L_7$ | $r_{13} = -193.509$ | $d_{13} = 12.00$ | $n_7 = 1.80518$ | $\nu_7 = 25.4$ |
| | | $r_{14} = 44.121$ | $d_{14} = 6.16$ | | |
| | $L_8$ | $r_{15} = 246.478$ | $d_{15} = 5.00$ | $n_8 = 1.67000$ | $\nu_8 = 57.4$ |
| | | $r_{16} = -65.697$ | $d_{16} = 2.04$ | | |
| Third Lens Group | $L_9$ | $r_{17} = 5400.802$ | $d_{17} = 4.20$ | $n_9 = 1.59551$ | $\nu_9 = 39.2$ |
| | | $r_{18} = -79.115$ | $d_{18} = 0.20$ | | |
| | $L_{10}$ | $r_{19} = -89.330$ | $d_{19} = 2.00$ | $n_{10} = 1.81600$ | $\nu_{10} = 46.6$ |
| | | $r_{20} = 61.503$ | $d_{20} = 1.20$ | | |
| | $L_{11}$ | $r_{21} = 75.508$ | $d_{21} = 4.50$ | $n_{11} = 1.80400$ | $\nu_{11} = 46.6$ |
| | | $r_{22} = -323.125$ | | | |

| OVERALL FOCAL LENGTH f | 70 | 100 | 136 |
|---|---|---|---|
| $d_8$ | 65.46 | 25.65 | 1.06 |
| $d_{16}$ | 2.04 | 2.04 | 2.04 |

* * * * *